US007320076B2

(12) United States Patent
Caronni (10) Patent No.: US 7,320,076 B2
(45) Date of Patent: Jan. 15, 2008

(54) METHOD AND APPARATUS FOR A TRANSACTION-BASED SECURE STORAGE FILE SYSTEM

(75) Inventor: Germano Caronni, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 713 days.

(21) Appl. No.: 10/382,245

(22) Filed: Mar. 5, 2003

(65) Prior Publication Data
US 2004/0175000 A1 Sep. 9, 2004

(51) Int. Cl.
G06F 11/30 (2006.01)
G06F 12/14 (2006.01)
H04L 9/32 (2006.01)

(52) U.S. Cl. ..................................... 713/193
(58) Field of Classification Search ................ 713/193
See application file for complete search history.

(56) References Cited

U.S. PATENT DOCUMENTS

| 4,924,515 | A | * | 5/1990 | Matyas et al. ............... 380/280 |
| 5,963,960 | A | * | 10/1999 | Swart et al. ................ 707/202 |
| 6,249,866 | B1 | * | 6/2001 | Brundrett et al. ........... 713/165 |
| 6,289,455 | B1 | * | 9/2001 | Kocher et al. .............. 713/194 |
| 6,341,285 | B1 | * | 1/2002 | Blott et al. ..................... 707/8 |
| 6,490,680 | B1 | * | 12/2002 | Scheidt et al. .............. 713/166 |
| 6,611,812 | B2 | * | 8/2003 | Hurtado et al. ............... 705/26 |
| 6,640,305 | B2 | * | 10/2003 | Kocher et al. .............. 713/194 |
| 6,684,226 | B1 | * | 1/2004 | Bodilsen ..................... 707/203 |
| 6,874,001 | B2 | * | 3/2005 | Narang et al. .............. 707/203 |
| 6,898,709 | B1 | * | 5/2005 | Teppler ...................... 713/178 |
| 7,010,808 | B1 | * | 3/2006 | Leung et al. ................. 726/26 |

OTHER PUBLICATIONS

E. Mauriello, "TCFS: Transparent Cryptographic File System," Linux Journal #40, Aug. 1997, 8 pages.
G. Cattaneo et al., "The Design and Implementation of a Transparent Cryptographic Filesystem for UNIX," USENIX Annual Technical Conf. 2001, Freenix Trac, Boston, MA, Jun. 29, 2001, 14 pages.
P. Braam, "The Coda Distributed File System," School of Computer Science, Carnegie Mellon University, May 2000, http://www.coda.cs.cms.edu, 10 pages.

* cited by examiner

Primary Examiner—Gilberto Barron, Jr.
Assistant Examiner—Farid Homayounmehr
(74) Attorney, Agent, or Firm—Osha• Liang LLP (57) ABSTRACT

A method for generating a secure storage file system, including encrypting data using a symmetric key to obtain encrypted data, encrypting the symmetric key using a public key to obtain an encrypted symmetric key, storing the encrypted data and the encrypted symmetric key if the public key is associated with a user who only has read permission, generating an encrypted hashed data if the public key is associated with a user who has write permission, and storing the encrypted data, the encrypted symmetric key, and the encrypted hash data if the public key is associated with the user who has write permission.

35 Claims, 5 Drawing Sheets

METHOD AND APPARATUS FOR A TRANSACTION-BASED SECURE STORAGE FILE SYSTEM

BACKGROUND OF INVENTION

Secure storage is becoming increasingly common as corporations move towards storing data primarily in electronic form. Unlike paper documents (i.e., "hard copies"), electronic documents are harder to secure and thus easily compromised. To address this issue, there has been an increasing interest in secure storage schemes. One such secure storage scheme that is commonly used is the Transparent Cryptographic File System (TCFS).

TCFS is a cryptographic distributed file system that is implemented on the architecture provided by the Network File System (NFS®) developed by Sun Microsystems, Inc. (NFS is a registered trademark of Sun Microsystems, Inc., Calif., USA). NFS has become commonly-used in distributed computing; allowing data to be accessed from a common file repository from any machine connected directly or remotely to the common file repository. Within this context, a number of security issues arise, such as unauthorized users gaining access to restricted services, etc. To prevent this from happening, the TCFS protects data at the system level.

In the TCFS scheme, data is stored in a secure server in encrypted form. When a client application requests data stored in the secure server, a request is sent to the secure server to retrieve a block of data, e.g., one or more files, corresponding to the request. The block of data is then transmitted to the client. A client kernel, running on the client, decrypts the block of encrypted data and then passes the decrypted block of data to the client application. When a request is generated by the client application to save the block of data back to the secure server, the client kernel encrypts the data and sends it back to the secure server, where the block of data is stored in encrypted form. Using this scheme, TCFS requires the client application and user to trust the client kernel that accesses the file system.

Figure 1:
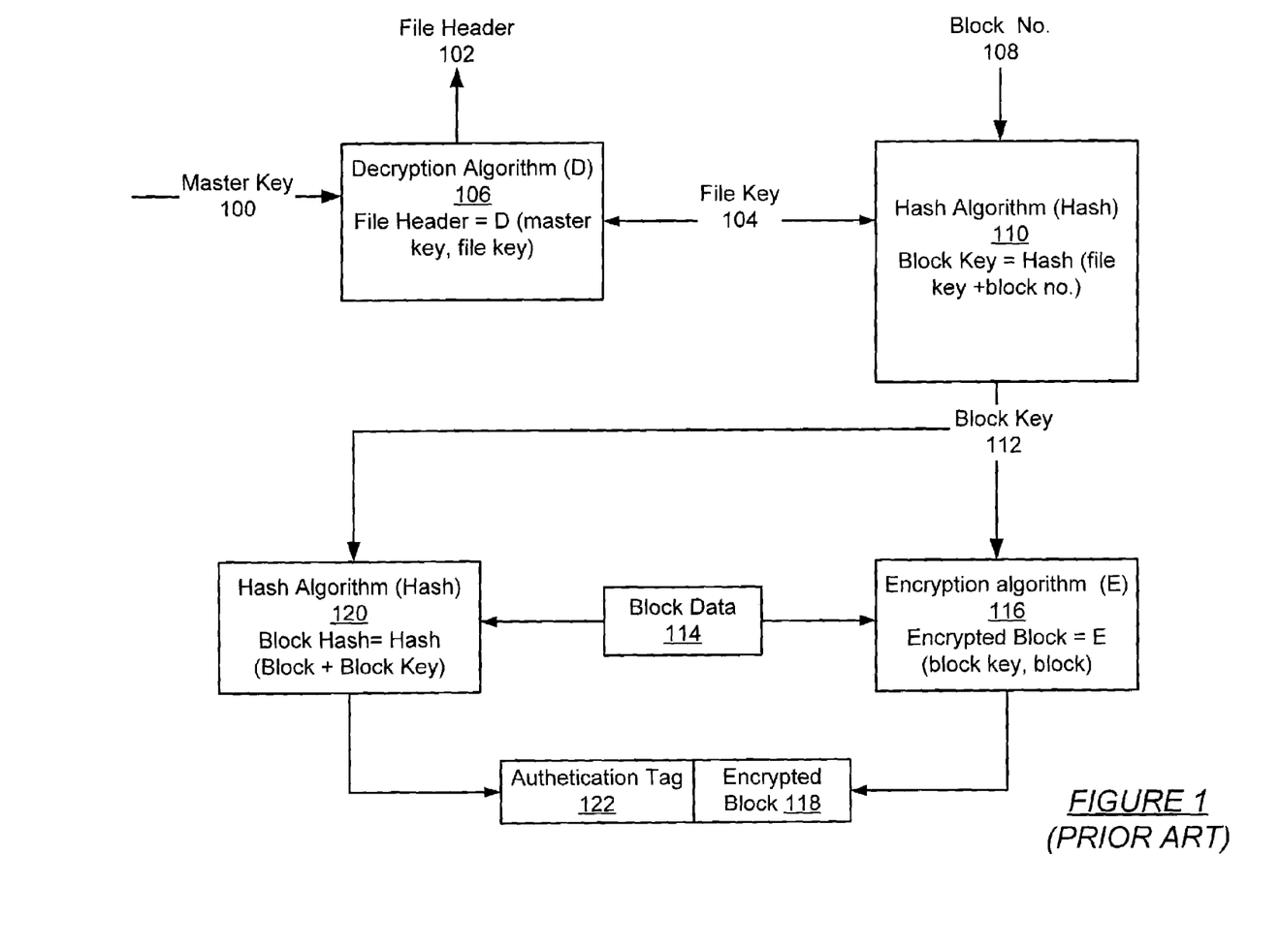
FIG. 1 illustrates a flow diagram detailing the typical method of encrypting blocks of data on a secure server using TCFS.

FIG. 1 shows a flow diagram that details the typical method of encrypting the blocks of data on the secure server using TCFS. Initially, a master key (100) is generated for each user, and a file key (104) is generated for each file or set of files. The file key(s) (104) is subsequently encrypted using a decryption algorithm (D) (106) and the master key (100) with the result being stored in a file header (102). The block number (108) of the block of data is then obtained and concatenated with the file key (104). The result of the concatenation is hashed using a hashing algorithm (110) to obtain a block key (112). The block data (114) is then encrypted using the block key (112) and an encryption algorithm (E) (116) to obtain an encrypted block (118). The block data (114) concatenated with the block key (112) is also hashed using a hashing algorithm (120) to generate an authentication tag (122). To obtain the data once it has been encrypted using the scheme described in FIG. 1, a user requests a specific block number (108) and have either the file key (104) or the master key (100).

The TCFS scheme described above also includes functionality to enable threshold sharing of files among users. Threshold sharing includes specifying a minimum number of members (i.e., the "threshold") that need to be "active" for the files owned by the group to become available. TCFS enforces the threshold sharing by generating a group encryption key for each group and giving each member of the group a share using a Threshold Secret Sharing Scheme (i.e., a portion of the group encryption key). The group encryption key can be reconstructed by any set of keys as long as the number of keys in the set is at least equal to the threshold.

A member of the group that intends to become active does so by pushing his/her share of the group key into the kernel. The TCFS module checks whether the number of shares available is above the threshold. If the number of shares is above the threshold, then the TCFS module reconstructs the group encryption key. Based on the properties of the Threshold Secret Sharing Scheme, if enough shares are available, the group encryption key is guaranteed to be correctly reconstructed.

Once the group encryption key has been reconstructed, the files owned by the group become accessible. Each time a member decides to become inactive, his/her share of the group encryption key is removed. The TCFS module checks whether the number of shares available is now less than the threshold at regular intervals. In this case, the group encryption key is removed from the TCFS module triggering files owned by the group to become inaccessible.

This TCFS implementation of the group sharing facility requires each member to trust the client kernel, which hosts the TCFS module, of the-machine that reconstructs the key to actually remove the group encryption key once the number of active users goes below the threshold.

SUMMARY OF INVENTION

In general, in one aspect, the invention relates to a method for generating a secure storage file system, comprising encrypting data using a symmetric key to obtain encrypted data, encrypting the symmetric key using a public key to obtain an encrypted symmetric key, storing the encrypted data and the encrypted symmetric key if the public key is associated with a user who only has read permission, generating an encrypted hashed data if the public key is associated with a user who has write permission, and storing the encrypted data, the encrypted symmetric key, and the encrypted hash data if the public key is associated with the user who has write permission.

In general, in one aspect the invention relates to a computer system generating a secure storage file system, comprising a processor, a memory, a storage device, a computer display, and software instructions stored in the memory for enabling the computer system under control of the processor, to perform encrypting data using a symmetric key to obtain encrypted data, encrypting the symmetric key using a public key to obtain an encrypted symmetric key, storing the encrypted data and the encrypted symmetric key if the public key is associated with a user who only has read permission, generating an encrypted hashed data if the public key is associated with a user who has write permission, and storing the encrypted data, the encrypted symmetric key, and the encrypted hash data if the public key is associated with the user who has write permission.

In general, in one aspect the invention relates to a secure storage system comprising a storage provider storing encrypted data, wherein storing the encrypted data comprises encrypting data using a symmetric key to obtain encrypted data, encrypting the symmetric key using a public key to obtain an encrypted symmetric key, storing the encrypted data and the encrypted symmetric key if the public key is associated with a user who only has read permission, generating an encrypted hashed data if the public key is associated with a user who has write permission, and storing the encrypted data, the encrypted symmetric key, and the encrypted hash data if the public key is associated with the user who has write permission, and a client device, wherein the client device comprises a client kernel for encrypting and decrypting the encrypted data, and a client application using the encrypted data.

In general, in one aspect, the invention relates to a method for updating a data view in a secure storage file system, comprising requesting an encrypted data, an encrypted symmetric key, and a transaction list associated with an encrypted data from a storage provider, wherein the storage provider stores the encrypted data using the secure storage file system, decrypting the encrypted symmetric key associated with the encrypted data using a private key associated with the public key to obtain the symmetric key, decrypting the encrypted data using the symmetric key to obtain a data view, verifying a transaction within the transaction list to determine if the author of the transaction had write permission at the time of the transaction, and updating the data view according to the transaction if the transaction is verified.

In general, in one aspect, the invention relates to an apparatus for generating a secure storage file system, comprising means for encrypting data using a symmetric key to obtain encrypted data, means for encrypting the symmetric key using a public key to obtain an encrypted symmetric key, means for storing the encrypted data and the encrypted symmetric key if the public key is associated with a user who only has read permission, means for generating an encrypted hashed data if the public key is associated with a user who has write permission, and means for storing the encrypted data, the encrypted symmetric key, and the encrypted hash data if the public key is associated with the user who has write permission.

Other aspects and advantages of the invention will be apparent from the following description and the appended claims.

DETAILED DESCRIPTION

Exemplary embodiments of the invention will be described with reference to the accompanying drawings. Like items in the drawings are shown with the same reference numbers.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 2:
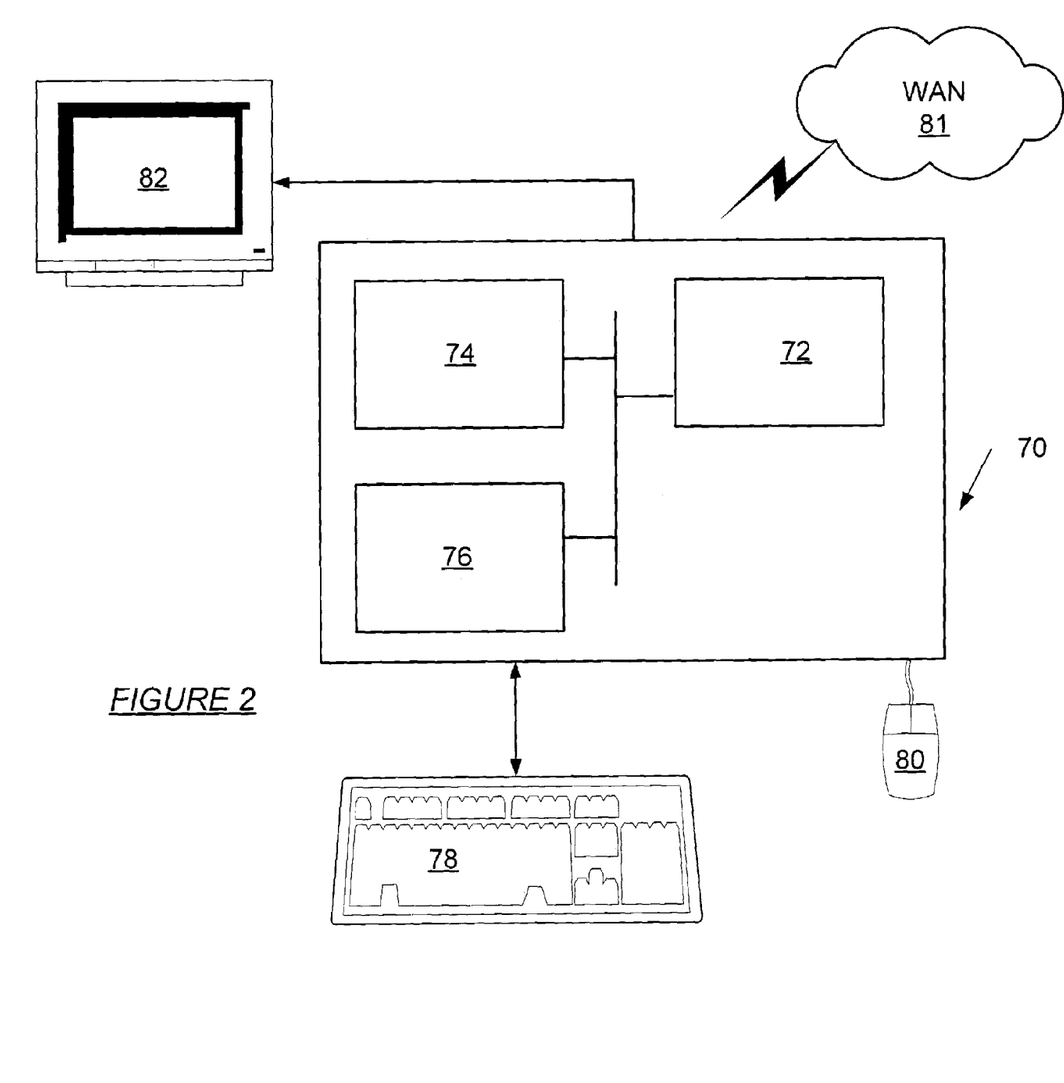
FIG. 2 illustrates a typical networked computer system.

The invention may be implemented on virtually any type computer regardless of the platform being used. For example, as shown in FIG. 2, a typical networked computer system (70) includes a processor (72), associated memory (74), a storage device (76), and numerous other elements and functionalities typical of today's computers (not shown). The computer (70) may also include input means, such as a keyboard (78) and a mouse (80), and output means, such as a monitor (82). The networked computer system (70) is connected to a wide area network (81) (e.g., the Internet) via a network interface connection (not shown). Those skilled in the art will appreciate that these input and output means may take other forms.

Figure 3:
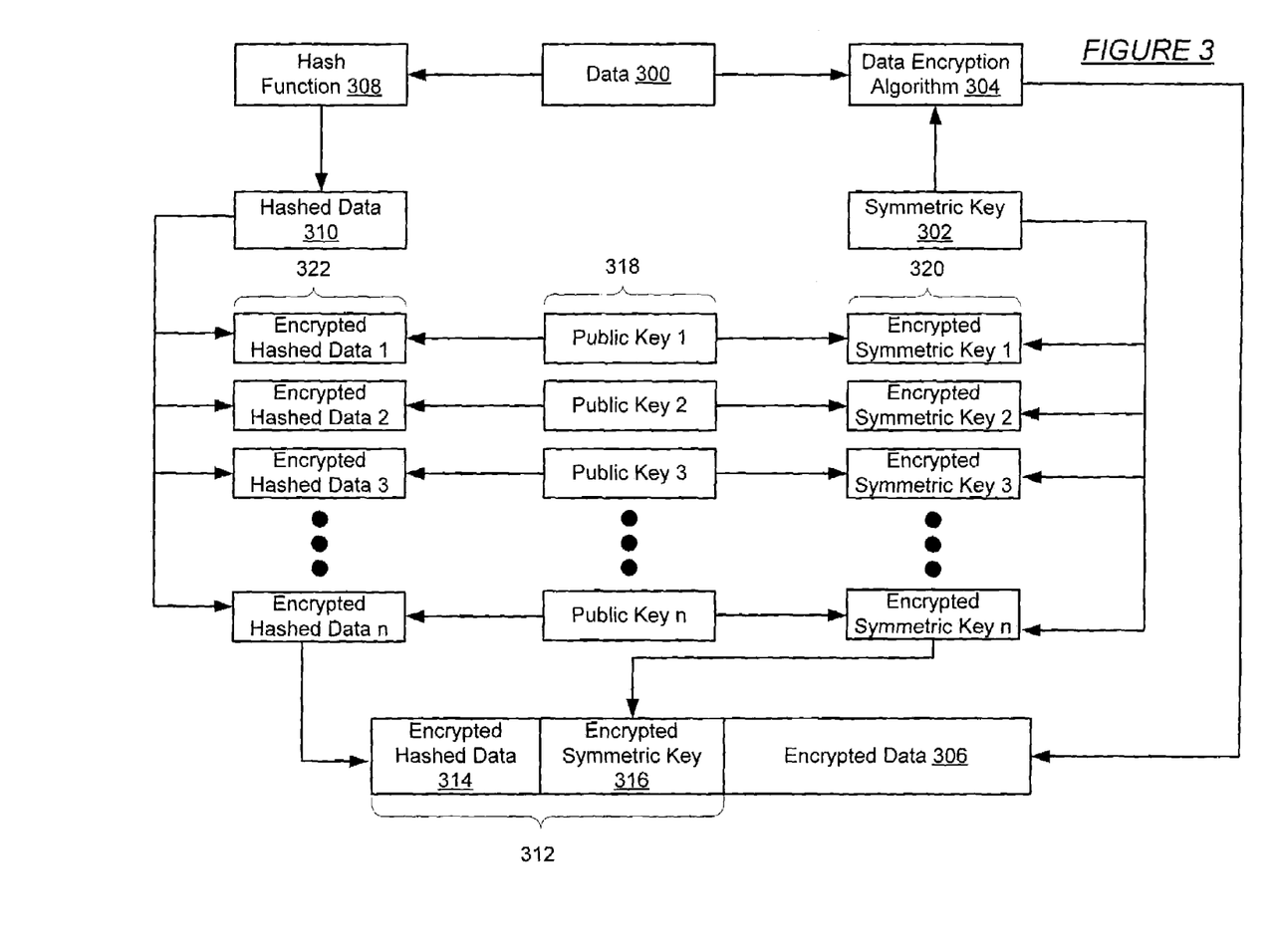
FIG. 3 illustrates a flow diagram in accordance with one embodiment of the invention.

FIG. 3 illustrates a flow diagram in accordance with one embodiment of the invention. Data (300), in the context of the invention may correspond to a single file or a file tree. To secure the data (300) a symmetric key (302) is initially generated by a client kernel (not shown) or obtained from a trusted source. The symmetric key (302) is used in conjunction with an encryption algorithm (304) to generate encrypted data (306). A hash function (308) is also applied to the data (300) to obtain hashed data (310).

The encrypted data (306) is appended to a header (312). While the header (312) shown in FIG. 3 only includes one encrypted hashed data (314) and one encrypted symmetric key (316), the header (312) may contain one or more encrypted hashed data (314) and one or more encrypted symmetric keys (316). The encrypted hashed data (314) is obtained by encrypting the hashed data (310) using a public key (318). Similarly, the encrypted symmetric keys (316) are obtained by encrypting the symmetric key (302) with the public keys (318). The corresponding private keys may be held by various users or stored in encrypted format by one or more key servers for another layer of indirection. Users (or processes on their behalf) access the keys directly, or over the key server, to obtain the actual data.

The various encrypted symmetric keys (320) and encrypted hash data (322) allows the data (300) to be accessed by various people having various access rights. For example, a read permission may correspond to having access to the decryption keys, for the data but not having the ability to sign the hash (e.g., generate the encrypted hashed data (314)). Thus, a user with a read permission has a private key that corresponds with a public key used to encrypt an encrypted symmetric key, but does not have a corresponding encrypted hashed data (i.e., an encrypted hashed data encrypted using the user's public key). In contrast, the write permission corresponds to having the ability to sign hash values as well as permission to read the data. In particular, the header contains both an encrypted symmetric key and an encrypted hashed data that were encrypted using a public key, which corresponds to the private key held by the user.

Additionally, there may be different write level permissions. For example, the write level permissions may be sub-divided into different sub-levels, such as insert, append, truncate, delete, etc. In one embodiment of the invention, a transaction-based or journaling file system is used to enforce the access control for the various sub-levels of the write permission. Further, the access control used in conjunction with the transaction-based or journaling file systems can either be performed by a client kernel directly, or by "reconciliation servers" on their behalf.

In one embodiment of the invention, a number of users may have access to one private key and accordingly all have the same access permission. If the members in the group change a new public/private key pair may be generated and used to re-encrypt the file or file-tree.

Figure 4:
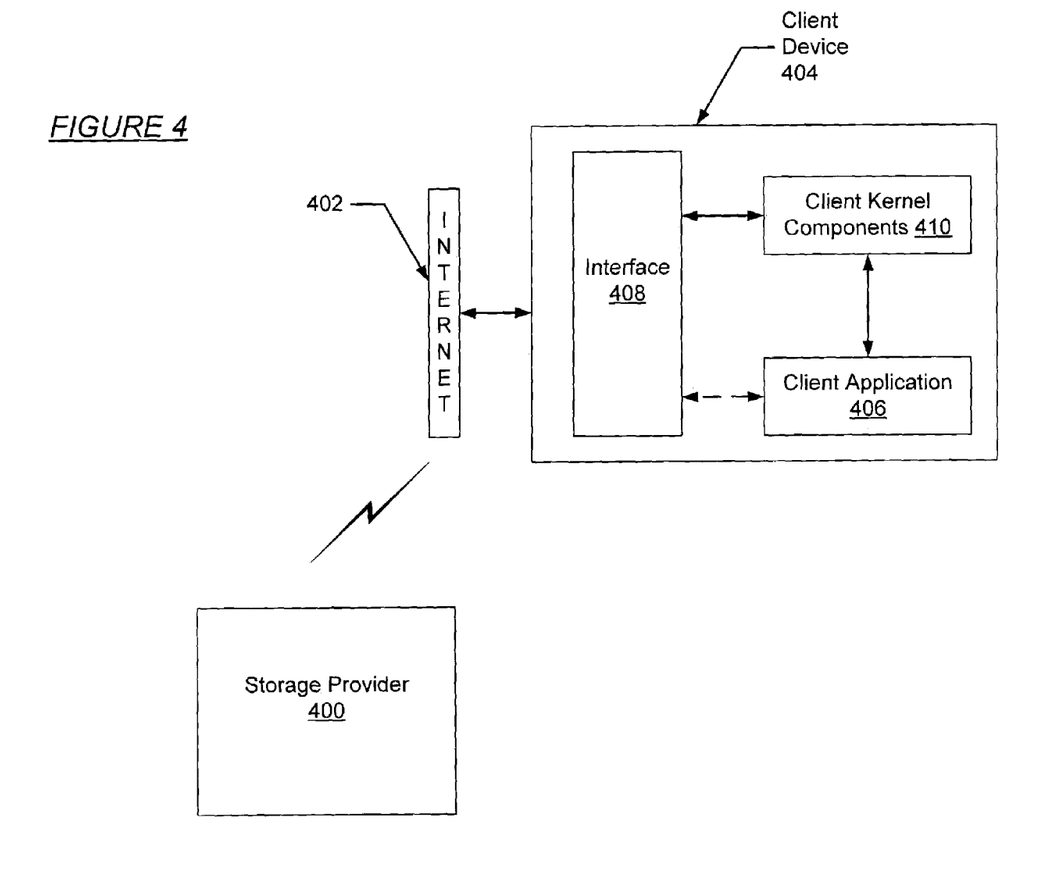
FIG. 4 illustrates a system in accordance with one embodiment of the invention.

FIG. 4 illustrates a system in accordance with one embodiment of the invention. The system includes of several components that may interact with each other. The system includes a storage provider (400), a communications infrastructure (402) (e.g., the Internet), and a client device (404).

The storage provider (400) may be any device that can store data under a given name, and later return the data to any device that requests the data. Examples of the storage provider (400) include a database server, an NFS file system, local disk space, a data storage provider offering its services over the Internet such as web hosting space, etc. In some cases, there may be multiple storage providers, and storage operations are redundantly issued to several of them, as the reliability and availability of particular storage provided is not assumed.

The storage provider (400) is typically connected via a communications infrastructure (402) such as the Internet to the client device (404). The transfer for data from the storage provider (400) to the client device (404) may be secured using Internet Protocol Security (IPSec), Secure Socket Layer (SSL), Supernets, etc., to provide end-to-end or groupwise security (i.e., authentication and confidentiality) communication. The client device (404) typically includes a number of sub-components. In particular, the client device (404) may include user-centric client applications (406) (i.e., login/logout functionality, access control management, etc.). Additionally, the client device usually includes an application interface (408) for client applications (i.e., 406 in FIG. 4) that are aware of secure storage schemes, such as the one shown in FIG. 3. Additionally, the client device (404) includes kernel components (410) that perform the bulk-encryption on a high level in the file system.

In one embodiment of the invention, the client device may include a pre-loaded shared library that can translate read/write/file name accesses into different read/write/file name accesses (without modifying the structure of the file system, and thus exposing the file system hierarchy). Alternatively, the shared library may also map read/write/file name accesses to a custom-implemented file system. The mapping may take place in the library itself, or in a process with which the library communicates (e.g., via shared memory (SHM)) and which acts on behalf of the library. The custom file system may reside on top of the existing file system and be realized as a set of opaque files, or alternatively, the file system may include of access to a raw block device (i.e., a floppy disk, tape drive, etc.).

In one embodiment of the invention, the request for files between a pre-existing file system and the client kernel (410) may be intercepted by a Virtual File System level, as a separate file system implementation, or by modifying an existing file system implementation.

Depending on the trust model used, the implementation of the invention may vary. In one embodiment, the secure storage device, such as a data server, is only trusted for storing data and, accordingly, a transaction-based approach may be necessary. The integrity of the data may be guaranteed by using the same key that is used for encryption of the data to also generate a message authentication code (MAC). A MAC is generated by calculating a cryptographically secure checksum on the block of data, and this checksum is secured by a symmetric or asymmetric key. Thus, only possessors of the encryption key (symmetric or asymmetric key) are able to prove to others that the data is valid. If a third-party tampers with the data, but does not have the encryption key, the third-party cannot generate a MAC, which matches the modified data block.

Accordingly, every transaction (i.e., change in the file system) caused by a user is authenticated, and then is stored as such. Users retrieving later versions of amended documents on the file system, receive all those transactions and are required to verify that each transaction was valid. Periodically, a user may merge all the transactions in one new file system view.

In one embodiment of the invention, the secure storage is trusted to reliably identify a user (i.e., guarantee his/her authenticity) and, accordingly, transaction-based file systems may be easily used. In particular, symmetric cryptography may be used for the actual authentication of the transaction.

In one embodiment of the invention, the secure storage is trusted to perform access control, and then the transaction-based file system may not be required, as each user can trust the view as presented by the server. Also, re-encryption of data is a less immediate need, because the server can deny read access to non-authenticated users.

Figure 5:
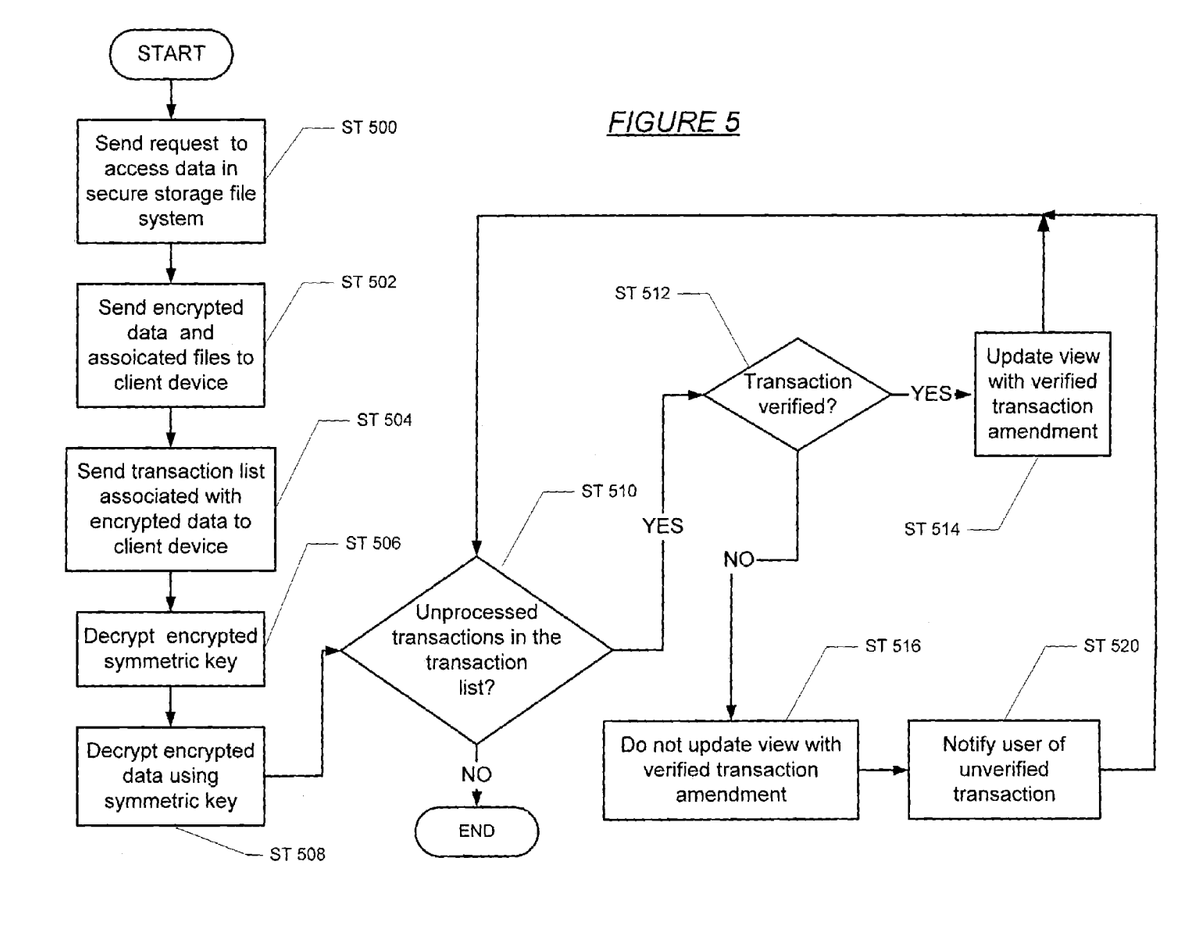
FIG. 5 illustrates a flow chart for using a secure storage file system in accordance with one embodiment of the invention.

FIG. 5 illustrates a flow chart for using a secure storage file system in accordance with one embodiment of the invention. Initially, a user (via a client application; 406 in FIG. 4) sends a request to access data in the secure storage file system (Step 500). This request may include, but is not limited to, the user's username and the user's password. The storage provider verifies the user's username and password, and forwards the encrypted data including the associated encrypted hashed data (314 in FIG. 3) and the associated encrypted symmetric key (316 in FIG. 3), to the client device (404 in FIG. 4) (Step 502). The storage provider also forwards a transaction list associated with the encrypted data to the client device (Step 504). The transaction list corresponds to a list of transactions that modified (i.e., over writing appending, deleting, etc.) the content of the data and the corresponding encrypted hash data of the user's that authored the changes.

Depending on the implementation of the client device, various components within the client device may perform steps 506-520. In one embodiment of the invention, the client kernel components (410 in FIG. 4) perform steps 506-520. In one embodiment of the invention, the client application performs steps 506-520. In one embodiment of the invention, functionality to perform steps 506-520 is distributed across the client kernel components and the client application.

Returning to FIG. 5, the encrypted symmetric key is decrypted using the user's private key (Step 506). The decrypted symmetric key is subsequently used to decrypt the encrypted data (Step 508). The transaction list is then reviewed to determine whether there are any unprocessed (i.e., unverified transactions) (Step 510). If there are unprocessed transaction, the first unprocessed transaction in the transaction list is verified to determine whether the user who performed the modification of the data had the correct access permissions (e.g., the hash data is correct) to perform such actions (Step 512). If the transaction is verified, then the current data view is updated to include the modifications made by the transaction (Step 514). The current data view corresponds to the state of the data at the last time the data view was updated.

However, if the transaction is not verified then the modification is not made to the data and the data view is not updated (Step 516). Further, the transaction may be flagged to bring this information to the attention of the user such that the user may take appropriate action (Step 520). Following Step 516 or Step 520, the transaction list is revisited to determine if there are any additional unprocessed transactions. The process continues until there are no additional unprocessed transactions. Upon completion of the aforementioned processes the user may store the updated data view back in the secure storage file system, or make changes to the updated data view and then store the updated data view, with the changes, back in the secure storage file system. Those skilled in the art will appreciate that the user will typically have a sufficient level of write permissions to store the updated data view back in the secure storage file system.

Embodiments of the invention may have one or more of the following advantages. The invention provides access control (distinct read/write/append/ truncate/delete) to files through cryptographic mechanisms. In addition the access control may be applied to large groups. Further, the invention provides kernel data access extensions for the cryptography and kernel file name access extensions for the cryptography. Moreover, the invention provides secure data storage without requiring a user to trust a storage provider or the intermediate communication infrastructure. Additionally, the invention allows data to be securely stored regardless of where the secure storage is located, e.g., the storage provider may be the local disk of a client or a remote client. Thus, the data is protected location-independent manner. Further, the invention provides a secure storage scheme that is transparent to client applications.

Those skilled in the art will appreciate that the bulk data encryption methods described in the present invention may be implemented on the storage provider, on the client device or on a proxy situated between the storage provider and the client device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a secure storage file system, comprising:
   encrypting data using a symmetric key to obtain encrypted data;
   encrypting the symmetric key using a public key to obtain an encrypted symmetric key;
   storing the encrypted data and the encrypted symmetric key as part of the secure storage file system if the public key is associated with a user who only has read permission;
   generating an encrypted hashed data if the public key is associated with a user who has write permission; and
   storing the encrypted data, the encrypted symmetric key, and the encrypted hashed data as part of the secure storage file system if the public key is associated with the user who has write permission.

2. The method of claim 1, further comprising:
   requesting the encrypted data, the encrypted symmetric key, the encrypted hashed data, and a transaction list associated with the encrypted data from a storage provider, wherein the storage provider stores the encrypted data using the secure storage file system;
   decrypting the encrypted symmetric key associated with the encrypted data using a private key associated with the public key to obtain the symmetric key;
   decrypting the encrypted data using the symmetric key to obtain a data view;
   verifying a transaction within the transaction list to determine if an author of the transaction had write permission at the time of the transaction, wherein verifying the transaction comprises determining whether the encrypted hashed data is correct; and
   updating the data view according to the transaction if the transaction is verified.

3. The method of claim 1, wherein generating the encrypted hashed data comprises hashing the data to obtain hashed data and encrypting the hashed data using the public key to obtain the encrypted hashed data.

4. The method of claim 1, wherein the data is selected from a group consisting of a file and a file-tree.

5. The method of claim 1, wherein the write permission comprises at least one sub-division.

6. The method of claim 5, wherein the sub-division is selected from a group consisting of insert, append, truncate, and delete.

7. The method of claim 1, wherein the secure storage file system is implemented using a preloaded shared library.

8. The method of claim 7, wherein the preloaded shared library translates read/write/file name accesses into different read/write/file name accesses.

9. The method of claim 1, wherein the secure storage file system is implemented using a shared library that includes functionality to map read/write/file name accesses to a custom-implemented file system.

10. A computer system generating a secure storage file system, comprising:
    a processor;
    a memory;
    a storage device;
    a computer display; and
    software instructions stored in the memory for enabling the computer system under control of the processor, to perform:
    encrypting data using a symmetric key to obtain encrypted data;
    encrypting the symmetric key using a public key to obtain an encrypted symmetric key;
    storing the encrypted data and the encrypted symmetric key as part of the secure storage file system if the public key is associated with a user who only has read permission;
    generating an encrypted hashed data if the public key is associated with a user who has write permission; and
    storing the encrypted data, the encrypted symmetric key, and the encrypted hashed data as part of the secure storage file system if the public key is associated with the user who has write permission.

11. The computer system of claim 10, wherein generating the encrypted hashed data comprises hashing the data to obtain hashed data and encrypting the hashed data using the public key to obtain the encrypted hashed data.

12. The computer system of claim 10, wherein the data is selected from a group consisting of a file and a file-tree.

13. The computer system of claim 10, wherein the write permission comprises at least one sub-division.

14. The computer system of claim 13, wherein the sub-division is selected from a group consisting of insert, append, truncate, and delete.

15. The computer system of claim 10, wherein the secure storage file system is implemented using a preloaded shared library.

16. The computer system of claim 15, wherein the preloaded shared library translates read/write/file name accesses into different read/write/file name accesses.

17. The computer system of claim 10, wherein the secure storage file system is implemented using a shared library that includes functionality to map read/write/file name accesses to a custom-implemented file system.

18. A secure storage file system comprising:
  a storage provider storing encrypted data, wherein storing the encrypted data comprises:
    encrypting data using a symmetric key to obtain encrypted data;
    encrypting the symmetric key using a public key to obtain an encrypted symmetric key;
    storing the encrypted data and the encrypted symmetric key as part of the secure storage file system if the public key is associated with a user who only has read permission;
    generating an encrypted hashed data if the public key is associated with a user who has write permission; and
    storing the encrypted data, the encrypted symmetric key, and the encrypted hashed data as part of the secure storage file system if the public key is associated with the user who has write permission; and
  a client device, wherein the client device comprises a client kernel for encrypting and decrypting the encrypted data, and a client application using the encrypted data.

19. The system of claim 18, wherein using the encrypted data by the client application comprises:
  requesting the encrypted data, the encrypted symmetric key, the encrypted hashed data, and a transaction list associated with the encrypted data from a storage provider, wherein the storage provider stores the encrypted data using the secure storage file system;
  decrypting the encrypted symmetric key associated with the encrypted data using a private key associated with the public key to obtain the symmetric key;
  decrypting the encrypted data using the symmetric key to obtain a data view;
  verifying a transaction within the transaction list to determine if an author of the transaction had write permission at the time of the transaction, wherein verifying the transaction comprises determining whether the encrypted hashed data is correct; and
  updating the data view according to the transaction if the transaction is verified.

20. The system of claim 18, wherein generating the encrypted hashed data comprises hashing the data to obtain hashed data and encrypting the hashed data using the public key to obtain the encrypted hashed data.

21. The system of claim 18, wherein the data selected from a group consisting of a file and a file-tree.

22. The system of claim 18, wherein the write permission comprises at least one sub-division.

23. The system of claim 22, wherein the sub-division is selected from a group consisting of append, truncate, and delete.

24. The system of claim 18, wherein the secure storage file system is implemented using a preloaded shared library.

25. The system of claim 24, wherein the preloaded shared library translates read/write/file name accesses into different read/write/file name accesses.

26. The system of claim 18, wherein the secure storage file system is implemented using a shared library that includes functionality to map read/write/file name accesses to a custom-implemented file system.

27. A method for updating a data view in a secure storage file system, comprising:
  requesting an encrypted data, an encrypted symmetric key, an encrypted hashed data, and a transaction list associated with the encrypted data from a storage provider, wherein the storage provider stores the encrypted data using the secure storage file systems wherein the data is encrypted using the symmetric key, and
  wherein the symmetric key is encrypted using a public key;
  decrypting the encrypted symmetric key associated with the encrypted data using a private key associated with the public key to obtain the symmetric key;
  decrypting the encrypted data using the symmetric key to obtain a data view;
  verifying a transaction within the transaction list to determine if an author of the transaction had write permission at the time of the transaction, wherein verifying the transaction comprises determining whether the encrypted hashed data is correct; and
  updating the data view according to the transaction if the transaction is verified.

28. The method of claim 27, wherein the encrypted hashed data comprises hashed data encrypted using the public key.

29. The method of claim 27, wherein the data is selected from a group consisting of a file and a file-tree.

30. The method of claim 27, wherein the write permission comprises at least one sub-division.

31. The method of claim 30, wherein the sub-division is selected from a group consisting of insert, append, truncate, and delete.

32. The method of claim 27, wherein the secure storage file system is implemented using a preloaded shared library.

33. The method of claim 32, wherein the preloaded shared library translates read/write/file name accesses into different read/write/file name accesses.

34. The method of claim 27, wherein the secure storage file system is implemented using a shared library that includes functionality to map read/write/file name accesses to a custom-implemented file system.

35. An apparatus for generating a secure storage file system, comprising:
  means for encrypting data using a symmetric key to obtain encrypted data;
  means for encrypting the symmetric key using a public key to obtain an encrypted symmetric key;
  means for storing the encrypted data and the encrypted symmetric key as part of the secure storage file system if the public key is associated with a user who only has read permission;
  means for generating an encrypted hashed data if the public key is associated with a user who has write permission; and
  means for storing the encrypted data, the encrypted symmetric key, and the encrypted hash data as part of the secure storage file system if the public key is associated with the user who has write permission.

* * * * *

UNITED STATES PATENT AND TRADEMARK OFFICE
CERTIFICATE OF CORRECTION

| | | |
|---|---|---|
| PATENT NO. | : 7,320,076 B2 | Page 1 of 1 |
| APPLICATION NO. | : 10/382245 | |
| DATED | : January 15, 2008 | |
| INVENTOR(S) | : Germano Caronni | |

It is certified that error appears in the above-identified patent and that said Letters Patent is hereby corrected as shown below:

In Claim 27, column 10 (line 7), delete "systems" and replace with --system,--.

Signed and Sealed this

Thirteenth Day of May, 2008

JON W. DUDAS
*Director of the United States Patent and Trademark Office*